United States Patent [19]

Blizzard et al.

[11] Patent Number: 4,495,340

[45] Date of Patent: Jan. 22, 1985

[54] CURABLE MASSES PRODUCING CARBOXYFUNCTIONAL SILICONE COATINGS

[75] Inventors: John D. Blizzard, Bay City; Terence J. Swihart, Essexville, both of Mich.

[73] Assignee: Dow Corning Corporation, Midland, Mich.

[21] Appl. No.: 565,074

[22] Filed: Dec. 23, 1983

[51] Int. Cl.$^3$ ............................................. C08G 77/06
[52] U.S. Cl. ...................................... 528/15; 427/387; 428/447; 528/31; 528/32; 528/33; 528/26; 528/39
[58] Field of Search ................ 528/33, 26, 15, 31, 528/39, 32; 428/447; 427/387

[56] References Cited

U.S. PATENT DOCUMENTS

| | | | |
|---|---|---|---|
| 3,047,528 | 6/1982 | Bluestein | 260/37 |
| 3,198,820 | 8/1965 | Pines et al. | 528/39 |
| 4,011,362 | 3/1977 | Stewart | 428/447 |
| 4,322,518 | 3/1982 | Blizzard | 528/15 |

*Primary Examiner*—Melvyn I. Marquis
*Attorney, Agent, or Firm*—Andrew H. Ward

[57] ABSTRACT

Carboxyfunctional silicone coating compositions are disclosed. These compositions can be coated and cured upon various substrates to furnish smooth, tough, protective, cleanable surfaces. The compositions comprise: (A) a certain liquid copolymeric polyorganosiloxane; (B) a carboxyfunctional silicone; and (C) a catalyst.

34 Claims, No Drawings

CURABLE MASSES PRODUCING CARBOXYFUNCTIONAL SILICONE COATINGS

BACKGROUND OF THE INVENTION

The present invention relates to novel, curable carboxyfunctional silicone compositions. Said compositions are useful, in the cured state, as tough, protective, easily cleaned coatings for substrates.

Silicone coatings are in general quite well known. Pertinent to the present invention among such silicone coatings are those described in U.S. Pat. No. 4,322,518, issued Mar. 30, 1982 to J. Blizzard, and assigned to the assignee of the present invention. Said U.S. Patent describes compositions comprising: (1) certain liquid copolymeric organopolysiloxanes comprising $SiO_{4/2}$ units, silicon-bonded hydroxyl radicals and/or silicon-bonded hydride radicals; and (2) a polydiorganosiloxane in which the organic radical substituents are monovalent hydrocarbon radicals, with each of the molecules of said polydiorganosiloxane containing at least two vinyl radicals or silicon-bonded hydroxyl radicals.

While coatings based on silicones having monovalent hydrocarbon radicals have enjoyed great success, said coatings have a marked tendency to soil or pick up dirt. Moreover, said coatings tend to retain dirt even upon rinsing with water. Such soiling behavior presents obvious disadvantages for some applications, such as applications in which coated articles find use outdoors or in heavy soiling industrial, agricultural, or residential environments.

Silicone coatings in which some or all of the substituents are not monovalent hydrocarbon radicals are also known. For example, silicone coatings comprising carboxyacid functional silicones are known. U.S. Pat. No. 4,011,362, issued Mar. 8, 1977, discloses metal substrates coated with a composition consisting essentially of a carboxyacid functional silicone and polydimethylsiloxane.

Other curable compositions comprising carboxyfunctional silicones are known. For example, U.S. Pat. No. 3,047,528 issued July 31, 1962, discloses carboxyacid functional silicone compositions curable to elastomers. Said compositions also include fillers, and polyvalent metal compound curing agents.

While the coatings of U.S. Pat. No. 4,011,362 provide excellent release surfaces for metal substrates, said coatings do not possess the strength and toughness needed for many applications. Said coatings cannot be successfully applied to a substrate other than as a relatively thin film, such as 0.025 mm or less.

The filled compositions of U.S. Pat. No. 3,047,528, on the other hand, are difficult if not impossible to apply as a coating less than 0.25 mm thick on a substrate.

Thus it would be beneficial to provide a carboxyfunctional silicone coating material capable of being applied to a substrate as a moderate to thick film, i.e. from about 0.025 mm to 0.25 mm thick. It would also be beneficial if the subsequently cured film could have a high degree of toughness and strength.

SUMMARY OF THE INVENTION

It is an object of the present invention to provide curable masses that can be applied to and cured upon substrates to provide protective coatings. It is a further object that said coatings be resistant to soiling. It is another object that said coatings have a surface that is readily cleanable by simple rinsing with water. It is yet another object to provide curable masses that form tough, protective coatings upon cure.

These objects and other objects are realized by the curable masses of the present invention. Said masses comprise: (A) certain liquid copolymeric polysiloxanes; (B) a carboxyfunctional silicone and (C) a catalyst.

DETAILED DESCRIPTION OF THE INVENTION

The present invention relates to a curable mass comprising the combination of:
(A) the reaction product of
  (i) an organosilicon resin consisting essentially of $R_3SiO_{\frac{1}{2}}$ units and $SiO_{4/2}$ units wherein
    R represents a monovalent hydrocarbon radical, and the ratio of $R_3SiO_{\frac{1}{2}}$ units to $SiO_{4/2}$ units is from 0.6/1 to 0.9/1, and
  (ii) a polyorganohydrogensiloxane;
(B) a carboxyfunctional silicone having the general unit formula

$$Q_a R'_b SiO_{(4-a-b)/2}$$

wherein
  Q is a carboxyfunctional radical,
  R' is selected from the group consisting of monovalent hydrocarbon radicals, hydride radicals, and hydroxy radicals,
  a has a value of 0 to 3,
  b has a value of 0 to 3,
  the sum of the values of a plus b is from 1 to 3, there being at least one Q radical and at least one R' radical selected from the group consisting of hydride radicals, vinyl radicals, and hydroxy radicals; and
(C) a catalytically effective amount of a catalyst.

In other aspects, the present invention further relates to solids obtained by curing the curable masses of the present invention, and to articles of manufacture comprising said solids bonded to substrates.

Component (A) of the curable masses of the present invention is the reaction product of: (i) an organosilicon resin consisting essentially of $R_3SiO_{\frac{1}{2}}$ units and $SiO_{4/2}$ units, wherein R is a monovalent hydrocarbon radical and the ratio of $R_3SiO_{\frac{1}{2}}$ units to $SiO_{4/2}$ units is from 0.6/1, to 0.9/1; and (ii) a polyorganohydrogensiloxane.

Component (A) of the curable masses of the present invention is disclosed in U.S. Pat. No. 4,310,678, issued Jan. 12, 1982 to Blizzard and Swihart and assigned to the assignee of the present inventors. The specification of U.S. Pat. No. 4,310,678 is hereby incorporated into the present specification by reference to describe component (A) of the present invention and to teach methods of synthesizing said component (A).

Briefly stated, component (A) can be synthesized by reacting together:
  (i) an organosilicon resin containing essentially of $R_3SiO_{\frac{1}{2}}$ units and $SiO_{4/2}$ units in the ratio stated above; and
  (ii) a polyorganohydrogensiloxane.

R in reactant (i) represents a monovalent hydrocarbon radical, that is, a monovalent radical composed of hydrogen atoms and carbon atoms. R can thus be an alkyl radical, such as methyl, ethyl, butyl, propyl and the like; an alkenyl or cycloalkenyl radical, such as vinyl, allyl, cyclopentenyl and the like; an aryl radical, such as phenyl, tolyl, xylyl and the like; an arylalkyl radical, such as beta-phenylethyl, beta-phenylpropyl and the like; or a cycloaliphatic radical, such as cyclohexyl, cyclopentyl, cycloheptyl and the like. Preferably R is a lower alkyl radical, such as methyl, ethyl, or propyl. Most preferably, R is a methyl radical. Minor amounts of vinyl radicals as R radicals are beneficial to enhance reactivity in come cases. Reactant (i) contains from 0.1% to 5% by weight, based on the total weight of reactant (i), of hydroxyl radicals bonded to silicon atoms. Minor proportions of alkoxy radicals are often unintentionally present in organosilicon resins. The presence of alkoxy radicals in reactant (i) is not thought to have any effect on the ultimate curable masses.

Preferably, reactant (i) is comprised of 1 to 5% by weight of silicon-bonded hydroxyl radicals, based on the total weight of reactant (i).

For the purpose of making component (A), reactant (i) is furnished dispersed in an organic solvent. The particular identity of the organic solvent is not critical, although it is advantageous to select an organic solvent which forms an azeotrope with water. Such organic solvents are well known, and include, for example, benzene, toluene, xylene, and trichloroethane.

Organosilicon resins useful as reactant (i) are well known. Said resins, and their synthesis, are described in U.S. Pat. No. 2,676,182, issued Apr. 20, 1954, which patent is incorporated herein by reference to teach a method of synthesis for reactant (i).

To summarize the preferred method of synthesis of reactant (i), the following steps are followed:

1. An aqueous solution of sodium silicate is acidified to a pH value of less than about 5;
2. The resulting mixture is treated with a source of $R_3SiO_{\frac{1}{2}}$ units;
3. The mixture from step 2 is heated, then cooled;
4. The product of step 3 is fractionally extracted with an appropriate, water-immiscible organic solvent. An organosilicon resin suitable for use as reactant (i) will then be isolated in the organic solvent fraction.

Sources of $R_3SiO_{\frac{1}{2}}$ units include compounds having the general formula $R_3SiX$, wherein X is a hydrolyzable radical, such as a halogen radical, or alkoxy radical; a disiloxane of the general formula $(R_3Si)_2O$; or other sources of $R_3SiO_{\frac{1}{2}}$ units known to those skilled in the art.

Preferably, the extraction in step 4 above is carried out in such a manner that from 0.0018 to 0.018 equivalents of acid per gram of reactant (i) remain in the solvent/reactant (i) fraction.

Reactant (ii) of component (A) of the curable masses of the present invention is a polyorganohydrogensiloxane, as described in U.S. Pat. No. 4,322,518. By polyorganohydrogensiloxan it is meant herein a liquid polyorganosiloxane containing, on average, at least one silicon-bonded H radical per molecule.

Reactant (ii) can have a linear, cyclic, or branched polymeric structure, or appropriate combinations of these structures, provided that said reactant (ii) is a liquid. Radicals of reactant (ii) that are not silicon-bonded hydrogen radicals are selected from monovalent hydrocarbon radicals as hereinabove described.

A linear polyorganohydrogensiloxane consisting essentially of $(CH_3)(H)SiO$ units, and having a degree of polymerization of from 25 to 75 repeat units is a preferred reactant (ii).

Polyorganohydrogensiloxanes suitable for use as reactant (ii) are well known; many are available commercially. Said polyorganohydrogensiloxanes need not be further detailed herein.

Reactant (i) and reactant (ii) can be reacted together to form component (A) preferably in the following manner:

Reactant (i), dispersed in organic solvent, is first thoroughly mixed with reactant (ii). The resultant mixture is heated to volatilize and remove the organic solvent from the mixture. Said heating is preferably done in two stages. In a first stage, heating and removal of some of the organic solvent is accomplished at ambient pressure. In a second stage heating and solvent removal are continued at reduced pressure. The second stage is preferably continued until the organic solvent has been substantially removed.

By substantially removed it is meant herein that the concentration of organic solvent is less than 1% by weight, based on the total weight of the mixture.

If reactant (i), as furnished, does not contain from 0.0018 to 0.018 equivalents of acid per gram, it is necessary to add the appropriate amount of a strong acid, such as HCl, to the reaction mixture.

Generally, from 10 to 90 parts by weight of reactant (i) are reacted with 90 to 10 parts by weight of reactant (ii). More preferably, roughly equal parts by weight of reactants (i) and (ii) are used, such as 40 to 60 parts by weight of reactant (i) and 60 to 40 parts by weight of reactant (ii), all of the above parts based on 100 total parts by weight of component (A).

Component (B) of the curable masses of the present invention is a carboxyfunctional silicone. By carboxyfunctional silicone it is meant herein a siloxane polymer composed of units having the general formula $R'_aQ_bSiO_{(4-a-b)/2}$, wherein R' is a monovalent hydrocarbon radical, a has an integer value of 0 to 3, b has an integer value of 0 to 3, and the sum of the values of a and b is, on average, from 1 to 3. Q in the above formula represents a carboxyfunctional radical, by which it is meant herein a radical bearing a —COOH function, or a carboxy acid function; a —COOM function, wherein M represents a monovalent metal cation; or a —COOY function, wherein Y denotes a hydrocarbon radical having 1 to 5 carbon atoms. There must be at least one Q radical per molecule on average. The —COOH, —COOM, or —COOY function is connected to the silicon atom in the above formula by a divalent hydrocarbon radical, divalent oxyhydrocarbon radical, or divalent thiohydrocarbon radical. Bonding to the silicon atom in the above formula is through a silicon-carbon bond.

Component (B) has the general unit formula $R_aQ_bSiO_{(4-a-b)/2}$.

In the above general unit formula, Q is a carboxyfunctional radical, said radical containing a function selected from the group consisting of the —COOH function, the —COOM function, wherein M represents a metal cation, and the —COOY function, wherein Y represents a monovalent hydrocarbon radical containing 1 to 5 carbon atoms.

Examples of suitable metal cations, M, in the —COOM function, include alkali metal cations such as K, Na, Li and the like; and other metal cations, such as Zn, Fe, Zr, and Mg. Those skilled in the art will recognize that divalent metal cations, such as $Fe^{2+}$, require two of the —COO$^-$ anion species to complex with, thus generating a unit formula of —COO$(Fe^{2+})_{\frac{1}{2}}$.

Examples of suitable Y radicals for the —COOY function, are monovalent hydrocarbon radicals, such as alkyl radicals such as methyl, ethyl, propyl, butyl and pentyl; alkenyl radicals, such as vinyl, allyl, and the like; cycloalkyl, such as cyclopentyl, and the like.

The —COOH, COOM, or COOY function is bonded to the silicon atom of the general unit formula $R'_aQ_bSiO_{(4-a-b)/2}$ by a divalent hydrocarbon radical, divalent oxyhydrocarbon radical, or divalent thiohydrocarbon radical.

A divalent hydrocarbon radical consists of hydrogen and carbon atoms. Examples of suitable divalent hydrocarbon radicals include alkylene radicals of the formula —$C_nH_{2n}$—, wherein n has an integer value of 2 or more. Suitable divalent hydrocarbon radicals further include divalent radicals containing cyclic structures, such as aromatic hydrocarbon groups or cycloaliphatic groups. Said cyclic structures are present either in the main chain, or are present as pendant groups.

Thus, suitable divalent hydrocarbons include, but are not limited to, such structures as

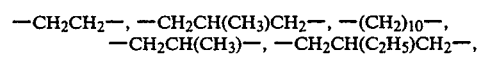

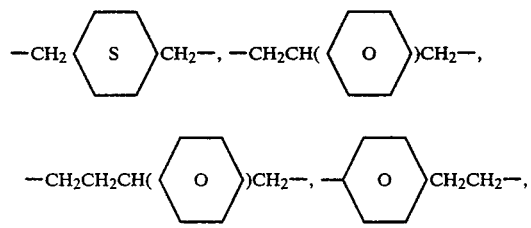

and the like.

Suitable divalent oxyhydrocarbon radicals are divalent hydrocarbon radicals as described above with one or more oxygen atoms inserted within the above described hydrocarbon radical as an ether linkage. Examples of suitable divalent oxyhydrocarbon radicals include, but are not limited to,

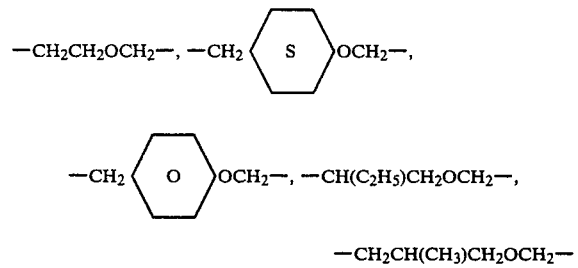

—CH$_2$CH(CH$_3$)CH$_2$OCH$_2$— and the like.

Suitable divalent thiohydrocarbon radicals are divalent hydrocarbon radicals as described above with one or more sulfur atoms inserted within the hydrocarbon radical as a thioether linkage. Examples of suitable divalent thiohydrocarbon radicals include, but are not limited to,

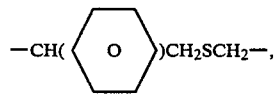

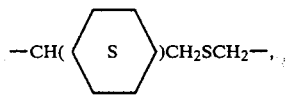

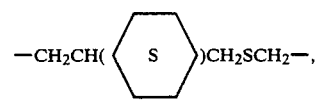

and the like.

Preferably, the divalent radical contains from 2 to 14 carbon atoms.

Especially preferred Q radicals are —CH$_2$CH$_2$SCH$_2$COOH, —CH$_2$CH$_2$SCH$_2$COOLi, —CH$_2$CH(CH$_3$)OCH$_2$COOH, —CH$_2$CH(CH$_3$)SCH$_2$COOH, and —CH$_2$CH(CH$_3$)COOH.

R' in the general unit formula $R'_aQ_bSiO_{(4-a-b)/2}$ is a monovalent hydrocarbon radical as described for the R radical of reactant (i) of component (A), or a vinyl, hydride or hydroxyl radical.

The value of a in the general unit formula can be 0, 1, 2, or 3. The value of b can be 0, 1, 2, or 3. The sum of the values of a and b is from 1 to 3 for the purposes of the present invention. There must be at least one Q radical per carboxyfunctional silicone molecule, on average. That is to say, the carboxyfunctional silicone must contain one unit wherein b has a value of one or more. Additionally, at least one R' radical must be selected from the group consisting of vinyl radicals, hydride radicals and hydroxyl radicals.

Preferably, the values of a and b are such that a substantially linear polymer results. For example, if the value of the sum of a and b is from about 1.8 to about 2.2 a substantially linear polymer results. Such a substantially linear polymer is termed herein a polydiorganosiloxane. Thus a preferred carboxyfunctional silicone is a polydiorganosiloxane having the general formula:

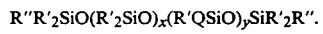

R' in the above formula is a monovalent hydrocarbon radical of the same description as the R radical for reactant (i) of component (A).

R" is selected from the group consisting of Q radicals and R' radicals, vinyl radicals, hydride radicals, and hydroxyl radicals. The polydiorganosiloxane must contain, on average, at least one vinyl radical or hydroxyl radical per molecule.

In the above general formula x has a value of from 0 to 7,000, and y has a value of 10 to 5,000. Thus component (B) can range in viscosity from a readily pourable liquid to a highly viscous gum having a viscosity of 25,000,000 centipoise or more.

Polydiorganosiloxanes useful as component (B) are well known. Some are commercially available. Others can be synthesized by well known techniques using available starting materials.

For example, polydiorganosiloxanes suitable for use as component (B) can be synthesized by the well known acid equilibration procedure. In said procedure, a silane having the desired carboxyfunctional radical substituent, one or two R' radicals as previously described, and one or two hydrolyzable groups can be hydrolyzed and condensed. Appropriate endblocking species and/or cyclosiloxanes bearing R' groups can be condensed.

Condensation is catalyzed by strong acids, such as trifluoromethane sulfonic acid.

Examples of hydrolyzable groups include hydroxy groups, alkoxy groups, and halogen radicals. Examples of appropriate endblocking species are silanes of the general formula $R''R'_2SiX$, wherein $R''$ and $R'$ are as previously defined and X is a hydrolyzable group. Another appropriate endblocking species is $(R''R'_2Si)_2O$, $R''$ and $R'$ having the previously defined identities.

Polydiorganosiloxanes suitable for use as component (B) wherein the Q radical is a metal salt of a carboxy acid radical can be synthesized by simply adding the stoichiometric amount of a soluble metal hydroxide to a carboxy acid functional polydiorganosiloxane having the desired structure.

Component (C) of the curable masses of the present invention is a catalyst selected from the group consisting of hydrosilylation catalysts, silanol condensation catalysts, and basic catalysts.

Hydrosilylation catalysts, that is catalysts for the general reaction

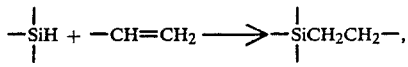

are well known. Examples of hydrosilylation catalysts are complexes and salts of certain metals, such as Pt, Pd, Ni, Ru, Rh, Cu, Os, and Ir. Preferred hydrosilylation catalysts for use as component (C) are salts and complexes of said metals that are soluble in component (B) of the curable masses of the present invention. Especially preferred are complexes of Pt that are soluble in component (B), such as the complex formed by the addition of chloroplatinic acid to tetramethyldivinyldisiloxane.

Silanol condensation catalysts, that is, catalysts for the general reaction

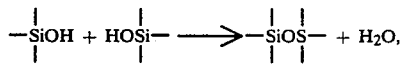

are also well known. Silanol condensation catalysts include the amine and carboxylic acid salts of Pb, Zn, Zr, Sb, Fe, Cd, Sn, Ba, Ca, and Mn. Preferred silanol condensation catalysts are salts that are soluble in component (B). Especially preferred are the carboxylic acid salts of Sn, such as stannous octoate.

Basic catalysts that are useful as component (C) of the curable masses of the present invention include $NH_3$, alkali metal hydroxides, such as KOH, NaOH, and the like.

The relative amounts of component (A) and (B) that are to be used in the curable masses of the present invention are not narrowly critical. Said relative amounts can be varied widely, thus producing a variety of curable masses that yield coatings of varying hardness. In general, the higher the proportion of component (A) relative to component (B) the harder will be the resulting coating.

Thus, from 10 parts to 90 parts of component (A) can be used with from 90 parts to 10 parts of component (B). More preferably, from 40 to 60 parts of component (A) can be used with from 60 parts to 40 parts of component (B). All of the above parts are by weight, based upon 100 total parts of component (A) plus component (B).

Component (C), the catalyst, is present in the curable mass in a catalytically effective amount. By catalytically effective amount it is meant herein an amount sufficient to allow cure of a mixture of component (A) and component (B) in a reasonable amount of time, such as one hour or less, at a reasonable elevated temperature, such as from 50° to 250° C. By cure it is meant herein that the elastomer or coating that has been cured is not soluble in a solvent that dissolves the not yet cured composition. Exemplary of such solvents are aromatic hydrocarbon solvents, such as benzene, toluene, or xylene. Thus, an uncured coating will swell, or dissolve.

Determination of a catalytically effective amount of a given catalyst is a matter for routine experimentation, and can vary rather widely. Generally, from 0.001% to 1% by weight, based on the total weight of the curable mass is a reasonable range for catalytically effective amounts of hydrosilylation or silanol condensation catalysts. As an example, 0.007% by weight of Pt has been found to be a catalytically effective amount of a hydrosilylation catalyst, said percentage being calculated by weight of Pt per se, on the basis of the total weight of component (A) plus component (B).

Cure times that are sufficient to cure the curable masses of the present invention can range from a few seconds to about an hour at temperatures of from 50° C. to 250° C. Sufficient cure times for a given curable mass can be varied by varying the relative amount of component (C), and/or varying the temperature. In general, the minimum sufficient cure time is inversely proportional to the cure temperature and inversely proportional to the concentration of component (C).

The curable masses of the present invention are prepared by mixing together the desired amounts of components (A), (B), and (C) until a simple mixture is obtained. By a simple mixture it is meant herein a uniform mixture having no gross visual discontinuity.

Equipment suitable to obtain a simple mixture from components (A), (B), and (C) is readily available and well known. For curable masses wherein component (B) is a relatively low viscosity liquid, such as 5 to 1000 centipoise, such well known equipment as mechanical stirrers, paddle stirrers and the like will suffice to produce a simple mixture. If the desired composition comprises a higher viscosity component (B), such as a component (B) having a viscosity of from 1000 to 100,000 centipoise, such equipment as three roll mills, sigmoid-blade mixers, bread dough mixers and the like will also suffice to produce a simple mixture. In the event that component (B) has a viscosity in excess of 100,000 centipoise, such equipment as two roll mills, Baker Perkins Ⓡ mixers and the like will suffice to produce a simple mixture of components (A), (B), and (C).

While mixing together of components (A), (B), and (C) can be accomplished by simply supplying the desired quantities of the three components to suitable mixing equipment, it will be advantageous in some cases to supply the mixture in two parts. As a first part, a mixture of components (B) and (C) can be supplied. As a second part, component (A) can be supplied. The two parts can then be mixed just prior to curing. The provision of curable masses in two or more separate parts which are mixed just prior to use is a well known practice. The advantage of such a practice is that shelf life is maximized.

The curable masses of the present invention can contain other, optional ingredients. Exemplary of such optional ingredients are: fillers, such as extending fillers or reinforcing fillers; organic dyes; pigments; bacteriostats and bactericides; fungistats and fungicides; cure control agents; organic solvents; and other optional ingredients.

Specific cure control agents that are contemplated are organosilicon oligomers containing unsaturated groups and hydrosilylation inhibitors.

Examples of organosilicon oligomer cure control agents are low molecular weight methylvinylsiloxanes, copolymeric oligomers comprising methylvinylsiloxy units and dimethylsiloxy units, methylallyl siloxanes, methylvinylcyclosiloxanes, and the like.

Hydrosilylation inhibitors are organic compounds which are known to inhibit the hydrosilylation reaction, and volatilize upon application of heat. Exemplary of hydrosilylation inhibitors are certain volatile compounds containing a carbon-carbon triple bond, such as methyl butynol, and various other acetylene derivatives.

Organic solvents can be added to the curable masses of the present invention to lower the viscosity of said curable masses. Examples of suitable organic solvents include, but are not limited to, aliphatic hydrocarbons, such as pentane, hexane, cyclohexane, heptane, isooctane and the like; aromatic hydrocarbons such as benzene, toluene, mesitylene and the like; alcohols, such as methanol, ethanol, isobutanol, propanol, isopropanol and the like; volatile silicones, such as dimethylcyclosiloxanes; and commercial solvent mixtures, such as neutral mineral spirits, naphtha, mineral oil and the like. Other suitable organic solvents will be apparent to those skilled in the art.

The organic solvent can be present in amounts from 0 to 98% by weight, based on the total weight of components (A), (B), (C), and organic solvent. More preferably, the organic solvent is present from 30% to 70% by weight on the above basis. Most preferably, the organic solvent is present from 40% to 60% by weight on the above basis.

Curable masses of the present invention comprising a relatively low molecular weight, and thus low viscosity, component (B), are especially useful as thin coatings (e.g. from about 0.0025 mm to about 0.050 mm in thickness). Curable masses of the present invention comprising a relatively high molecular weight component (B) are particularly useful as thicker coatings (e.g. from 0.025 mm to 0.500 mm thick).

Examples of substrates upon which the curable masses of the present invention can be coated include, but are not limited to: cellulosic substrates, such as paper or wood; mineral substrates, such as glass, stone, concrete and cement; metal and metal alloy substrates, such as aluminum, steel, silicon, magnesium, copper, brass, and bronze; rubber substrates such as natural rubber, SBR, silicone rubber, and butyl rubber; and plastics, such as polyolefins such as polyethylene, polypropylene, and polymethylpentene; polyimides; polyamides, such as various well known nylon compositions; and polyesters such as polyethylene terephtalate and polybutylene terephtalate.

Suitable coating techniques are flow coating, dip coating, roller coating, kiss coating, spray coating, manual brushing, and other known coating techniques.

Examples of specific applications in which the curable masses of the present invention are believed to be useful include: protective, easily cleaned coatings for electrical or electronic devices, such as solar cells, circuit boards and the like; protective coatings for decorative articles used outdoors or in heavy soil environments; soiling resistant, easily cleaned coatings for silicone rubber used in, e.g. residential gasket and glazing applications; protective coatings or treatments for fabrics or proteinaceous substrates such as human hair; and various industrial, veterinary, agricultural, and other uses.

Surprisingly, some of the curable masses of the present invention, wherein component (B) comprises a Li salt of a carboxylic acid function, are useful as water activated adhesives.

The following examples are here presented to further illustrate the present invention. These examples are not to be construed as imposing limits on the present invention. All parts and percentages set forth in the examples are by weight unless otherwise specified. Pressures reported herein were measured in mm Hg. The term Me in the following examples represents the methyl radical.

Test Procedures

The following test procedures were used to evaluate cured films in the following examples.

Smear—Smear of a coating was evaluated by lightly rubbing the cured coating with a finger. A wholly cured coating will not change in appearance upon rubbing. No change in appearance in the smear test is recorded in the following examples as "none". Excessive smear, as indicated by major changes in the appearance of the coating, is noted in the following examples as "gross".

Rub-off—Rub-off of a coating was evaluated by vigorously rubbing the cured coating with a finger. The result "none" indicates that the coating could not be removed in this manner. The result "gross" indicates that the coating was easily removed.

Migration—Migration was evaluated herein by: first, adhering a strip of standard adhesive-coated tape to the cured coating by firmly pressing the side coated with adhesive to the cured coating; second, removing the tape from the cured coating by peeling the tape up; third, doubling the removed tape back upon itself with the adhesive-coated side adhering to itself; and fourth, comparing the force required to peel the doubled tape to the force required to peel a freshly prepared, similarly doubled tape which had never been adhered to the coating. If the force required is substantially the same, no migration of the coating or components thereof has occurred. This result is recorded as "none" with respect to migration. Total loss of adherence indicates that gross amounts of migration of coating components has taken place. This result is recorded as "gross".

Release—Release was evaluated by, first, applying a strip of adhesive-coated tape to a cured coating by firmly pressing the tape to the coating; second, peeling the tape from the coating. The relative force required to peel the tape was then recorded in terms of the relative amount of force required.

Cleanability Test—The ability of a coating to be easily cleaned, i.e. to release soil upon simple rinsing or washing procedures, was evaluated herein by the Cleanability Test. Each coating to be tested was first dusted with finely divided charcoal dust. Second, the amount of dust adhering upon inversion of each coating sample was noted. Third, water was gently sprayed upon each sample and the amount of dust remaining, if any, was noted.

The above procedure was repeated, with a freshly dusted sample, in a washing step consisting of wiping with a paper towel moistened with water.

The above procedure was repeated, with a freshly dusted sample, in a washing step consisting of wiping with a paper towel dampened with isopropanol.

The results after each of the above procedures were recorded in descriptive terms.

EXAMPLE 1

I Preparation of Component (A)

A mixture was charged to a vessel provided with a stirrer, said mixture consisting of:

(i) 41.2 parts of a polymer having the average formula

$Me_3SiO(MeHSiO)_{35}SiMe_3$;

(ii) 41.2 parts of an organosilicon resin composed of $Me_3SiO_{\frac{1}{2}}$ units and $SiO_{4/2}$ units in a ratio of 0.6$Me_3$-$SiO_{\frac{1}{2}}$ units to 1$SiO_{4/2}$ unit; and 17.6 parts of xylene. This mixture, with continuous stirring, was heated to a temperature of 150° C. The pressure in the vessel was gradually reduced to a value between 40 mm and 50 mm Hg. Heating under reduced pressure was continued for approximately 2 hours. During this time, volatilized xylene was collected and condensed in a reservoir separate from the vessel containing the mixture. After 2 hours, the reaction product was recovered. It was a substantially solvent free liquid organosilicon resin as described hereinabove as component (A) of the curable mass of the present invention.

II Preparation of the Curable Mass

The following components were mixed by simple stirring:

Component (A) produced in part I of this example: 50 parts

A carboxyfunctional silicone having the average formula:

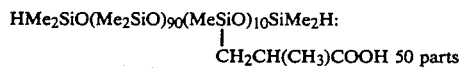

$HMe_2SiO(Me_2SiO)_{90}(MeSiO)_{10}SiMe_2H$:
       |
       $CH_2CH(CH_3)COOH$  50 parts xylene: 100 parts
methylvinylcyclosiloxanes having an average degree of polymerization of 5: 7.5 parts
methyl butynol: 2.5 parts
Pt complex formed by reacting chloroplatinic acid with tetramethyl divinyl disiloxane, said complex comprising 0.7% Pt: 1.0 parts III Application, Curing, and Testing The mixture from part II of this example was coated on an aluminum panel with a drawdown bar. The thickness of the film after the solvent had evaporated was approximately 0.038 mm. The coated aluminum panel was then placed in an air circulating oven set at a temperature of 150° C., for 5 minutes. After 5 minutes, the coated panel, with a cured film bonded thereto, was removed from the oven and allowed to come to room temperature. The cured film was inspected, and was found to have a smooth surface. The cured film was observed to be brittle.

The cured coating was evaluated. The results of this evaluation are set forth in Table 1.

EXAMPLE 2

The procedures of Example 1 were followed in each respect, except that the curable mass comprised 70 parts of the component (A) of Example 1, and 30 parts of the carboxyfunctional silicone of Example 1. All the other components were present in the same proportion listed in Example 1. Results upon testing are set forth in Table 1.

Comparison 1

A composition was prepared having the following components:
carboxyfunctional silicone of Example 1: 14 parts
polydimethylsiloxane containing $(Me)(CH_3=CH)SiO$ units: 100 parts
xylene: 104 parts
methylvinylcyclosiloxanes having an average degree of polymerization of 5: 7.5 parts
methylbutynol: 2.5 parts
Pt complex of Example 1: 1.0 parts This composition was cured and tested by the procedure set forth in Example 1. The film, after cure, was found to be gummy. Other testing results are set forth in Table 1.

Comparison 2

A composition was prepared having the following components:
Component (A) from Example 1: 14 parts
Polydimethylsiloxane containing $(Me)(CH_2=CH)SiO$ units: 100 parts
xylene: 104 parts
methylvinylcyclosiloxanes having an average degree of polymerization of 5: 7.5 parts
methylbutynol: 2.5 parts
Pt complex of Example 1: 1.0 parts This composition was cured and tested by the procedure of Example 1. The film, after cure, was found to be tough. Other testing results are set forth in Table 1.

TABLE 1

| | | Evaluation of Cured Films | | |
| | | | Cleanability Test | |
| Example | Appearance | after initial soiling | after washing spray | after water wipe |
|---|---|---|---|---|
| 1 | smooth, brittle | dust adhered | 50% washed off | 100% wiped off |
| 2 | tough, brittle | dust adhered | 50% washed off | 100% wiped off |
| comparison 1 | gummy | dust adhered | no change | ground in |
| comparison 2 | tough | dust adhered | no change | smeared |

TABLE 2

| Example | Evaluation of Cured Films | | | | |
|---|---|---|---|---|---|
| | after isopropyl alcohol wipe | Smear | Migration | Rub-off | Release |
| 1 | 100% wiped off | none | none | none | medium |
| 2 | 100% wiped off | none | none | none | low-medium |
| comparison 1 | ground in | gross | gross | gross | easy-low |
| comparison 2 | 100% wiped off | none | none | none | easy-low |

EXAMPLES 3 AND 4

The following compositions were made, applied to aluminum panels at a thickness of 0.05 mm, and cured by the procedure of Example 1:

EXAMPLE 3 component (A) of Example 1: 50 parts
alkali metal salt of a carboxylic acid functional silicone polymer having the average formula

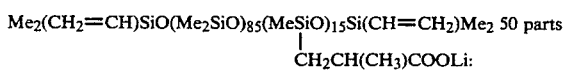

methylvinylcyclosiloxanes having an average degree of polymerization of about 5: 7.5 parts
toluene: 50 parts
methanol: 50 parts
methyl butynol: 2.5 parts
Pt complex of Example 1: 1.0 parts

EXAMPLE 4 component (A) of Example 1: 30 parts
Li salt of Example 3: 70 parts
methylvinylcyclosiloxanes having an average degree of polymerization of 5: 7.5 parts
toluene: 50 parts
methanol: 50 parts
methyl butynol: 2.5 parts
Pt complex of Example 1: 1.0 parts The following observations were made of the cured films of Examples 3 and 4:

Both films were tough, and somewhat tacky to the touch.

Drops of the following substances were placed upon the surfaces of each of the cured films of Examples 3 and 4. Said drops remained upon the surfaces for 30 minutes, after which time the following observations were made:

| Substance | Observation |
|---|---|
| distilled water | partially dissolves the film; makes the surface agressively tacky |
| xylene | slight swelling of the surface |
| toluene | no change |
| isopropanol | no change in the film; surface becomes tacky |
| light oil | no change |

That which is claimed is:

1. A curable mass comprising the combination of:
 (A) the reaction product of
  (i) an organosilicon resin consisting essentially of $R_3SiO_{\frac{1}{2}}$ units and $SiO_{4/2}$ units wherein R represents a monovalent hydrocarbon radical, the ratio of $R_3SiO_{\frac{1}{2}}$ units to $SiO_{4/2}$ units is from 0.6/1 to 0.9/1 said resin containing from 0.1% to 5% by weight, based on the total weight of reactant (i), of hydroxyl radicals bonded to silicon atoms, and
  (ii) a polyorganohydrogensiloxane;
 (B) a carboxyfunctional silicone having the general unit formula $Q_aR'_bSiO_{(4-a-b)/2}$ wherein
  Q is a carboxyfunctional radical,
  R' is selected from the group consisting of monovalent hydrocarbon radicals, hydride radicals, and hydroxy radicals,
  a has a value of 0 to 3,
  b has a value of 0 to 3,
  the sum of the values of a plus b is from 1 to 3, there being at least one Q radical and at least of R' radical selected from the group consisting of hydride radicals, vinyl radicals, and hydroxy radicals; and
 (C) a catalytically effectiv amount of a catalyst.

2. A curable mass as claimed in claim 1 further comprising an organic solvent.

3. A curable mass as claimed in claim 2 wherein the carboxyfunctional silicone is a polydiorganosiloxane having the formula $$R''R'_2SiO(R'_2SiO)_x(R'QSiO)_ySiR'_2R''$$

wherein
 R' represents a monovalent hydrocarbon radical,
 R'' is selected from the group consisting of Q radicals, vinyl radicals, hydroxyl radicals, and hydride radicals, there being at least one radical per molecule selected from the group consisting of vinyl radicals, hydroxy radicals, and hydride radicals,
 x has a value of from 0 to 7000,
 y has a value of from 10 to 5000.

4. A curable mass as claimed in claim 3 wherein R' is the methyl radical.

5. A curable mass as claimed in claim 4 wherein R'' is the hydroxyl radical.

6. A curable mass as claimed in claim 5 wherein component (C) is a silanol condensation catalyst.

7. A curable mass as claimed in claim 6 wherein there is present 40 to 60 parts of component (A) and 60 to 40 parts of component (B), based on 100 total parts of (A) and (B).

8. A curable mass as claimed in claim 3 wherein R'' is selected from the group consisting of vinyl radicals and hydride radicals.

9. A curable mass as claimed in claim 8 wherein component (C) is a hydrosilylation catalyst.

10. A curable mass as in claim 9 wherein the hydrosilylation catalyst is a compound of platinum.

11. A curable mass as claimed in claim 10 wherein there is present 40 to 60 parts of component (A) and 60 to 40 parts of component (B), based on 100 total parts of (A) and (B).

12. A curable mass as claimed in claim 3 wherein Q is a carboxy acid radical.

13. A curable mass as claimed in claim 12 wherein R" is selected from the group consisting of vinyl radicals and hydride radicals, and component (C) is a compound of platinum.

14. A curable mass as claimed in claim 13 wherein there is present 40 to 60 parts of component (A) and 60 to 40 parts of component (B), based on 100 total parts of (A) and (B).

15. A curable mass as claimed in claim 3 wherein Q is a Li salt, R" is selected from the group consisting of vinyl radicals and hydride radicals, and component (C) is a compound of platinum.

16. A curable mass as claimed in claim 15 wherein there is present 40 to 60 parts of component (A) and 60 to 40 parts of component (B), based on 100 total parts of (A) and (B).

17. A curable mass as claimed in claim 3 wherein Q is a Na salt, R" is selected from the group consisting of vinyl radicals and hydride radicals, and component (C) is a compound of platinum.

18. A curable mass as claimed in claim 17 wherein there is present 40 to 60 parts of component (A), and 60 to 40 parts of component (B), based on 100 total parts of (A) and (B).

19. A curable mass as claimed in claim 3 wherein Q is a K salt, R" is selected from the group consisting of vinyl radicals and hydride radicals, and component (C) is a compound of platinum.

20. A curable mass as claimed in claim 19 wherein there is present 40 to 60 parts of component (A), and 60 to 40 parts of component (B), based on 100 total parts of (A) and (B).

21. A solid resulting from curing the curable mass of claim 1.

22. A solid resulting from curing the curable mass of claim 3.

23. A solid resulting from curing the curable mass of claim 8.

24. A solid resulting from curing the curable mass of claim 12.

25. A solid resulting from curing the curable mass of claim 15.

26. A solid resulting from curing the curable mass of claim 17.

27. A solid resulting from curing the curable mass of claim 19.

28. An article of manufacture comprising a substrate with the solid of claim 21 bonded thereto.

29. An article of manufacture comprising a substrate with the solid of claim 22 bonded thereto.

30. An article of manufacture comprising a substrate with the solid of claim 23 bonded thereto.

31. An article of manufacture comprising a substrate with the solid of claim 24 bonded thereto.

32. An article of manufacture comprising a substrate with the solid of claim 25 bonded thereto.

33. An article of manufacture comprising a substrate with the solid of claim 26 bonded thereto.

34. An article of manufacture comprising a substrate with the solid of claim 27 bonded thereto.

* * * * *